S. C. ROGERS.
Assignor to THE HART EMERY WHEEL COMPANY, (Limited.)
SAW FILING MACHINE.
No. 10,937. Reissued June 5, 1888.
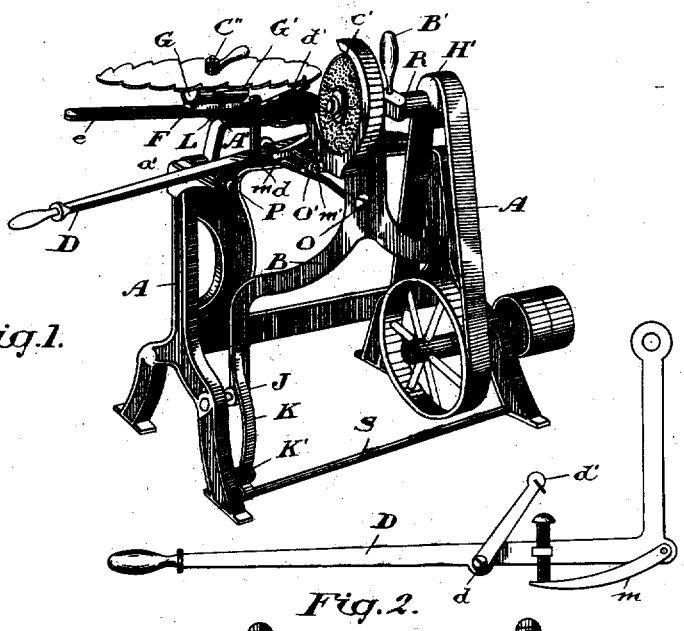
Fig. 1.
Fig. 2.
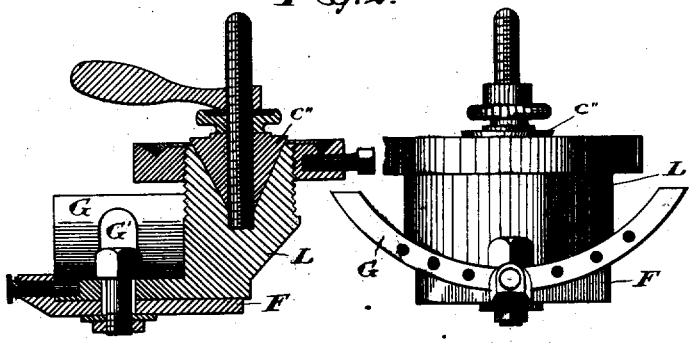
Fig. 3.
Fig. 4.
Witnesses.
Charles H. Riches.
J. M. Jackson.
Inventor.
S. C. Rogers.
by Donald C. Ridout & Co
Attys
N. PETERS, Photo-Lithographer, Washington, D. C.

UNITED STATES PATENT OFFICE.

SAMUEL C. ROGERS, OF HAMILTON, ONTARIO, CANADA, ASSIGNOR TO THE HART EMERY WHEEL COMPANY, (LIMITED.)

SAW-FILING MACHINE.

SPECIFICATION forming part of Reissued Letters Patent No. 10,937, dated June 5, 1888.

Original No. 338,787, dated March 30, 1886. Application for reissue filed March 14, 1888. Serial No. 267,189.

*To all whom it may concern:*

Be it known that I, SAMUEL C. ROGERS, a subject of the Queen of Great Britain, residing at the city of Hamilton, in the county of Wentworth, in the Province of Ontario, Canada, have invented a new and useful Saw-Filing Machine, of which the following is a specification.

My invention relates to improvements in machines for sharpening and gumming saws; and it consists in the construction and arrangement of the parts hereinafter mentioned and fully described and claimed, reference being made to the accompanying drawings, in which—

Figure 1 is an isometrical perspective view of a machine embodying my invention. Fig. 2 is a plan of bent lever hereinafter described. Fig. 3 is a sectional view of the saw-supporting device, and Fig. 4 is an elevation thereof.

In the drawings, A represents two double legs bolted to and supporting a frame, A′, the top of which is formed as a table projecting out at the back of the frame, the legs and frame being rigid and stationary when the machine is worked. In the vertical portion of the frame, and near the top, is a horizontal slot, made to receive and allow to work in it the bent lever D, which is attached at one end, by means of a screw, to the extremity of the table on its under side. On the top of the table is a slotted arm, *e*, attached to the table, so that it can be fixed and moved to any desired position. On this arm is an adjustable chuck, L, consisting of a concave base, F, a convex block, G, resting on the base and provided with a slot, G′, a vertical cone, *c″*, and lock-nuts. On the front of the concave base is a lug carrying a spring-plunger, which engages with holes formed in front of the convex block, allowing the block to be held at any desired angle when gumming or sharpening crosscut-saws. An oscillating frame, B, is connected with the legs at J, and carries a shaft running in the journal-box R. This shaft carries the emery-wheel *c′* at one end and a belt-pulley, H′, at the other end. On the cap of this box is the handle B′. The spring K, attached to the connecting-bar S and having its force controlled by the set-screw K′, acts on the oscillating frame B in such a manner as to carry the emery-wheel *c′* to the tooth of the saw and keep it in contact therewith.

In the frame B are two screws, *m′* and O, acting on the adjustable templet M, hereinafter described, and the pillar O′, respectively.

To the side of the left leg A, and near the top, is attached the bracket *a′*, provided with a lug and set-screw, P. This bracket supports the lever D, hereinafter described, while the set-screw P limits the action of said lever. The lever D, attached at one end, as before stated, to the under side of the table A′, extends through the slot before mentioned and is bent at a suitable angle. On this lever is the standard *d*, carrying the pawl *d′*, and on the top of this standard is a spring so devised as to keep the pawl pressed against the saw when the lever is in use. On this lever, at the angle, is the adjustable templet *m*, which acts on the screw *m′* when the lever is drawn forward, pressing the oscillating frame B outward in shaping the back of the tooth.

In working the machine the operator places the saw on the top of the convex block or chuck L, securing it with cone and lock-nuts in such a manner that the saw can be moved around easily, and then by means of the adjustable arm *e* and the slot in same sets the saw in such a position that the right-hand side of the wheel will be in line with the pitch of breast of tooth. He then gums all the teeth to the required depth and pitch of breast, being guided by screw O for depth and by the side of wheel for pitch of breast, using the handle B′ for this latter operation. He then allows the pawl to engage the tooth immediately to left of wheel, and moving the lever forward until it touches the adjustable stop P in bracket *a′*, the breast of that tooth is brought into exact line with the right-hand side of wheel. At the same time the adjustable templet M, acting against the screw M′, causes the wheel to move out in such a manner as to allow the wheel to grind the back of tooth to shape of templet. He then moves the lever back, allowing the pawl to engage the next tooth, at the same time allowing the wheel, by means of the adjustable templet and the screw M′, to move into the throat of the tooth, the back of which has just been ground. It will thus be seen that each tooth will be ground to the exact shape of the preceding one. The pawl and templet being both on the lever and working conjointly, the effect is to make and keep the saw true and jointed.

In sharpening crosscut-saws the operator secures the saw, as before described, and releasing the spring-plunger in concave base he tips the saw to the angle required for the proper filing of a crosscut-saw and fastens it by again engaging the plunger in the proper hole in front of the convex block. The saw is then moved in position before the wheel and the operator proceeds to sharpen it by using the handle B′ on the bearing-box R.

What I claim as my invention is--

1. A supporting-frame, a saw-holder, a sharpener, and a pivoted lever carrying a pawl arranged to engage with the teeth of the saw being operated upon, combined with a templet, and an adjustable stop independent of the templet for regulating the motion of the lever.

2. A supporting-frame, a saw-holder, a sharpener, and a pivoted operating-lever carrying a suitably-shaped templet, in combination with a movable frame carrying the grinding-wheel, and a stop on said movable frame.

3. A supporting-frame, a saw-holder, a sharpener, and a pivoted operating-lever carrying an adjustable templet, combined with a movable frame carrying the grinding-wheel, and a stop on said movable frame.

4. A supporting-frame, a saw-holder, a sharpener, and a pivoted operating-lever carrying an adjustable templet, in combination with a movable frame carrying the grinding-wheel, and an adjustable stop on said movable frame.

5. A supporting frame, a saw-holder, a sharpener, and a pivoted lever carrying a pawl arranged to engage with the teeth of the saw being operated upon, and a templet pivoted on the said lever and held at any desired angle by an adjusting-screw, in combination with the movable frame, and a stop on said frame carrying the grinding-wheel.

6. A supporting frame, a saw-holder, a sharpener, and a pivoted lever having attached to it a standard, *d*, carrying the pawl *d′*, working on a vertical pivot and having a spring device to keep the pawl pressed against the saw when lever is in use.

7. The combination of an arm, *e*, base F, block G, and cone *c″*, provided with means for holding the saw, substantially as described.

8. In a saw-filer, the combination of a lever, D, attached at one end to a table and carrying the pawl *d′*, the arm *e*, the base F, the block G, and the cone *c″*, provided with means for holding the saw, substantially as and for the purpose specified.

9. The combination of the lever D, attached at one end to a table, an adjustable templet, M, an oscillating frame, B, provided with stops O and M′, and emery-wheel *c′*, substantially as described.

10. In a saw-filer, the combination of a cone, *c″*, provided with means for holding the saw, a base, F, block G, arm *e*, table A′, lever D, pawl *d′*, templet M, oscillating frame B, provided with stops, and emery-wheel, substantially as described.

11. The combination of a slotted arm, *e*, concave base F, convex block G, and cone *c″*, provided with screw and jam-nuts, substantially as described.

12. In a saw-filer, the combination of a bent lever, D, attached at one end to a table and carrying the pawl *d′*, the slotted arm *e*, the concave base F, the convex block G, and the cone *c″*, provided with screw and jam-nuts for holding and moving the saw, substantially as described.

13. The combination of the bent lever D, attached at one end to a table, an adjustable templet, M, and oscillating frame B, provided with stops O and M′, and emery-wheel *c′*, substantially as described.

14. In a saw-filer, the combination of a cone, *c″*, provided with screw and jam-nuts, concave base F, convex block G, slotted arm *e*, table A′, bent lever D, pawl *d′*, templet M, oscillating frame B, provided with stops, and emery-wheel, substantially as described.

Buffalo, New York, December 27, 1887.

SAMUEL C. ROGERS.

In presence of—
J. K. BANCROFT,
J. P. HALLERS.